(12) United States Patent
Chen

(10) Patent No.: US 7,639,438 B2
(45) Date of Patent: Dec. 29, 2009

(54) LENS MODULE AND METHOD FOR FABRICATING SAME

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/110,552

(22) Filed: Apr. 28, 2008

(65) Prior Publication Data

US 2009/0109553 A1   Apr. 30, 2009

(30) Foreign Application Priority Data

Oct. 26, 2007   (CN)   ............. 2007 1 0202278

(51) Int. Cl.
*G02B 7/02* (2006.01)
*G02B 15/14* (2006.01)
(52) U.S. Cl. ..................... 359/819; 359/694
(58) Field of Classification Search .......... 359/819
See application file for complete search history.

(56) References Cited

U.S. PATENT DOCUMENTS 7,088,530 B1 *  8/2006  Recco et al. ............... 359/811
2008/0069556 A1   3/2008  Chen

* cited by examiner

*Primary Examiner*—Jordan M. Schwartz
*Assistant Examiner*—James C Jones
(74) *Attorney, Agent, or Firm*—Andrew C. Cheng

(57) ABSTRACT

A lens module includes a lens barrel, a first lens and a second lens. The first lens is received in the lens barrel. The first lens has a first central active portion and a first peripheral inactive portion. The first peripheral inactive portion includes a first base portion surrounding the first central active portion and a cylindrical portion extending upward from the first base portion. The second lens has a second central active portion and a second peripheral inactive portion. The second peripheral inactive portion includes a second base portion surrounding the second central active portion and a flange extending radially outward from the second base portion. The second base portion is engaged in the cylindrical portion and the flange is maintained above the cylindrical portion. A gap is maintained between the second peripheral inactive portion of the second lens and the first peripheral inactive portion of the first lens.

4 Claims, 5 Drawing Sheets

LENS MODULE AND METHOD FOR FABRICATING SAME

BACKGROUND

1. Technical Field

The present invention relates to a lens module and a method for fabricating the lens module.

2. Description of Related Art

With the ongoing development of microcircuitry and multimedia technology, cameras, including, e.g., still cameras and digital cameras are now in widespread use. Such cameras need to meet the requirements of compactness and excellent optical performance.

Lens modules are key members of the cameras. A typical lens module includes a lens barrel, and a number of components arranged in the lens barrel, such as lenses, spacers and filters. Generally, the components are compacted together in the lens barrel. The lens module will then go through a temperature cycling test or a thermal shock test. However, as the lenses are sensitive to different temperatures, and stress may be generated between the lenses in such a compact situation in the temperature cycling test or thermal shock test, thereby, an optical resolution of the lens module will be lowered after the test.

What is needed, therefore, is a lens module which can minimize stress therein, and a method for manufacturing the lens module.

SUMMARY

An exemplary lens module includes a lens barrel, a first lens and a second lens. The first lens is received in the lens barrel. The first lens has a first central active portion and a first peripheral inactive portion. The first peripheral inactive portion includes a first base portion surrounding the first central active portion and a cylindrical portion extending upward from the first base portion. The second lens has a second central active portion and a second peripheral inactive portion. The second peripheral inactive portion includes a second base portion surrounding the second central active portion and a flange extending radially outward from the second base portion. The second base portion is engaged in the cylindrical portion of the first lens and the flange is maintained above the cylindrical portion of the first lens. A gap is maintained between the second peripheral inactive portion of the second lens and the first peripheral inactive portion of the first lens.

An exemplary method for fabricating a lens module includes steps of: providing a lens barrel, a first lens and a second lens, the first lens having a first central active portion and a first peripheral inactive portion, the first peripheral inactive portion including a first base portion surrounding the first central active portion and a cylindrical portion extending upward from the first base portion, the second lens having a second central active portion and a second peripheral inactive portion, the second peripheral inactive portion including a second base portion surrounding the second central active portion and a flange extending radially outward from the second base portion; placing the first lens into the lens barrel; engaging the second base portion of the second lens in the cylindrical portion of the first lens with the flange of the second lens being maintained above the cylindrical portion of the first lens and an gap being maintained between the second peripheral inactive portion of the second lens and the first peripheral inactive portion of the first lens; annealing the lens barrel together with the first lens and the second lens.

Other advantages and novel features of the present invention will become more apparent from the following detailed description of embodiment when taken in conjunction with the accompanying drawings.

BRIEF DESCRIPTION OF THE DRAWINGS

Many aspects of the lens module and the method can be better understood with reference to the following drawings. The components in the drawings are not necessarily drawn to scale, the emphasis instead being placed upon clearly illustrating the principles of the present lens module and method. Moreover, in the drawings, like reference numerals designate corresponding parts throughout the several views.

DETAILED DESCRIPTION OF THE EMBODIMENTS

Embodiments of the present lens module and method will now be described in detail below and with reference to the drawings.

Figure 1:
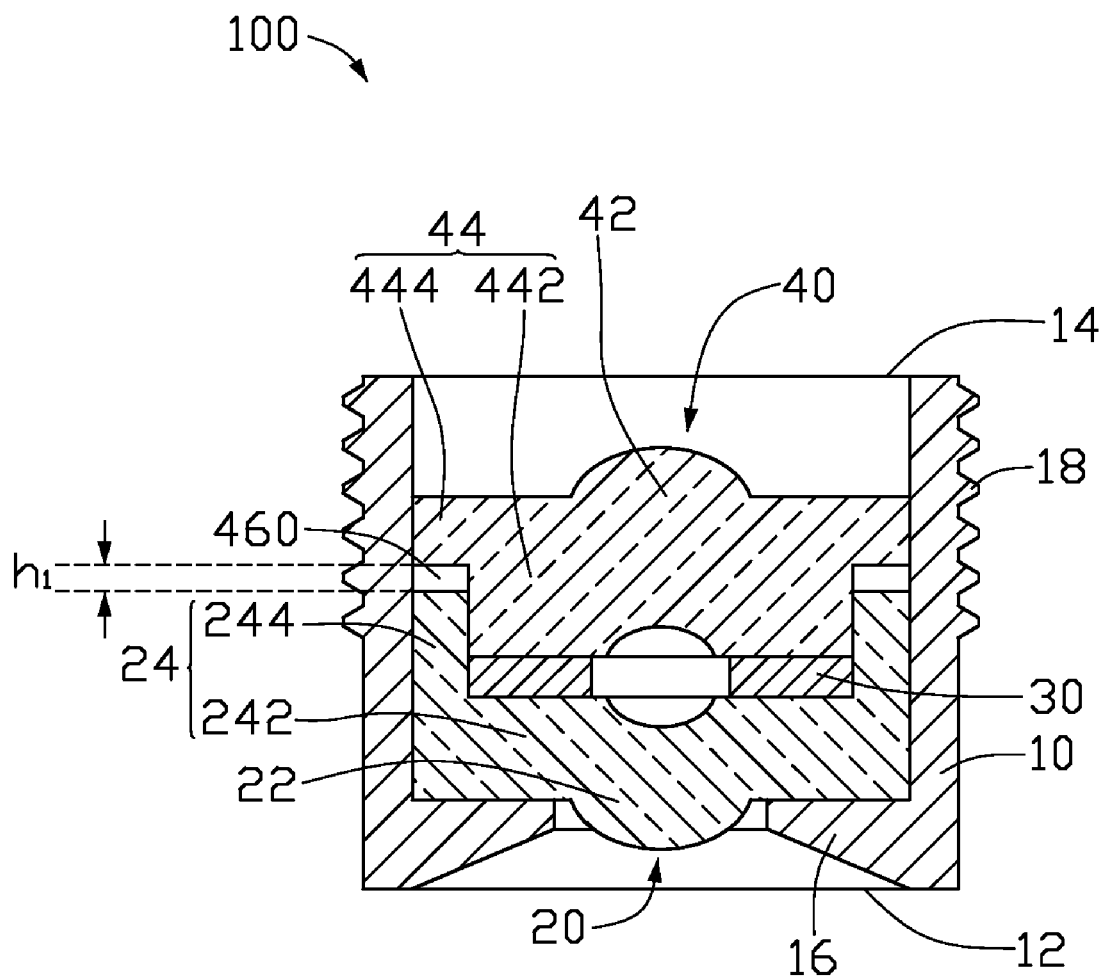
FIG. 1 is a schematic view of a lens module according to a first embodiment of the present invention.
Figure 2:
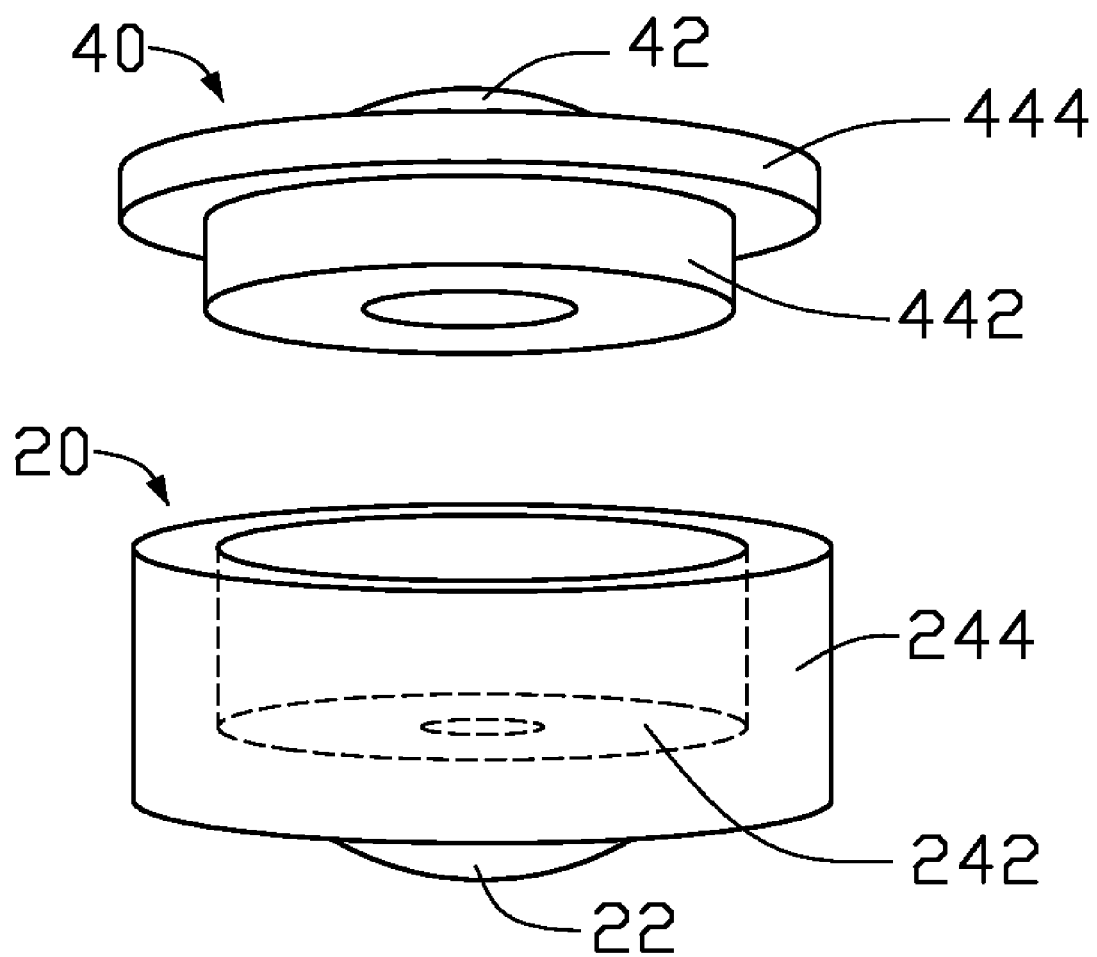
FIG. 2 is an isometric view of the first lens and the second lens shown in FIG. 1.

Referring to FIGS. 1 and 2, an exemplary lens module 100 according to a first embodiment is provided. The lens module 100 includes a lens barrel 10, a first lens 20, a spacer 30 and a second lens 40.

The lens barrel 10 can be made of poly carbonate (PC), acrylonitrile butadiene styrene (ABS), or a combination of the PC and ABS. The lens barrel 10 is in a cylinder shape. The lens barrel 10 has a first end 12 and an opposite second end 14. A retaining portion 16 is provided at the first end 12. A plurality of threads 18 are provided on an outer wall of the second end 14 for facilitating the lens barrel 10 engaging with a holder (not shown) or a main body of an electronic device.

The first and second lens 20, 40 each can be made of plastic or glass.

The first lens 20 has a first central active portion 22 and a first peripheral inactive portion 24. The first central active portion 22 can be in a spherical or aspherical shape, and light is able to pass through the first central active portion 22. The first peripheral inactive portion 24 includes a first base portion 242 and a cylindrical portion 244. The first base portion 242 surrounds the first central active portion 22. The cylindrical portion 244 extends upward from the first base portion 242 in a direction along an optical axis of the first central active portion 22.

The second lens 40 has a second central active portion 42 and a second peripheral inactive portion 44. The second central active portion 42 can be in a spherical or aspherical shape, and light is able to pass through the second central active portion 42. The second peripheral inactive portion 44 includes a second base portion 442 and a flange 444. The second base portion 442 surrounds the second central active portion 42. The flange 444 extends radially outward from the second base portion 442 in a direction perpendicular to an optical axis of the second central active portion 42.

A thickness of the spacer 30 can be designed according to need. In the present first embodiment, a thickness of the spacer 30 is in the range from 30 to 70 micrometers.

The lens barrel 10, the first lens 20, the spacer 30 and the second lens 40, as provided above, can be assembled together by performing the following steps of:

(1) placing the first lens 20 into the lens barrel 10;
(2) placing the spacer 30 into the cylindrical portion 244 of the first lens 20; and
(3) engaging the second base portion 442 of the second lens 40 in the cylindrical portion 244 of the first lens 20 with the bottom of the second base portion 442 contacting with the spacer 30, the flange 444 of the second lens 40 being maintained above the cylindrical portion 244 of the first lens 20 and an gap 460 being maintained between the flange 444 of the second lens 40 and the cylindrical portion 244 of the first lens 20.

In step (3), the second lens 40 is partially received in the first lens 20, and the first and second lenses 20, 40 become a compact and co-axis lens assembly. A distance $h_1$ between the flange 444 of the second lens 40 and the cylindrical portion 244 of the first lens 20 at the gap 460, as shown in FIG. 1, may be in the range from 2 to 200 micrometers, preferably, in the range from 30 to 100 micrometers. The gap 460 provides a space for the first and second lenses 20, 40 to extend during a temperature cycling test or a thermal shock test, thereby, helping releasing stress when it is generated or reducing stress generated thereof, thus preventing deformation of the first and second lenses 20, 40 after the test.

After the assembling steps above, the lens barrel 10 together with the first lens 20, the spacer 30 and the second lens 40 can go on an annealing step. The annealing step can be performed in air atmosphere, preferably in nitrogen atmosphere. A temperature of the annealing step is in the range from 70 to 95 Celsius degrees, preferably in the range from 80 to 90 Celsius degrees. The annealing step can last for 4 to 8 hours. The annealing step helps to reduce stress generated between the first and second lenses 20, 40 in the temperature cycling test or thermal shock test.

When the lens module 100 is completed, the entire lens module 100 can go through the temperature cycling test or the thermal shock test.

Figure 3:
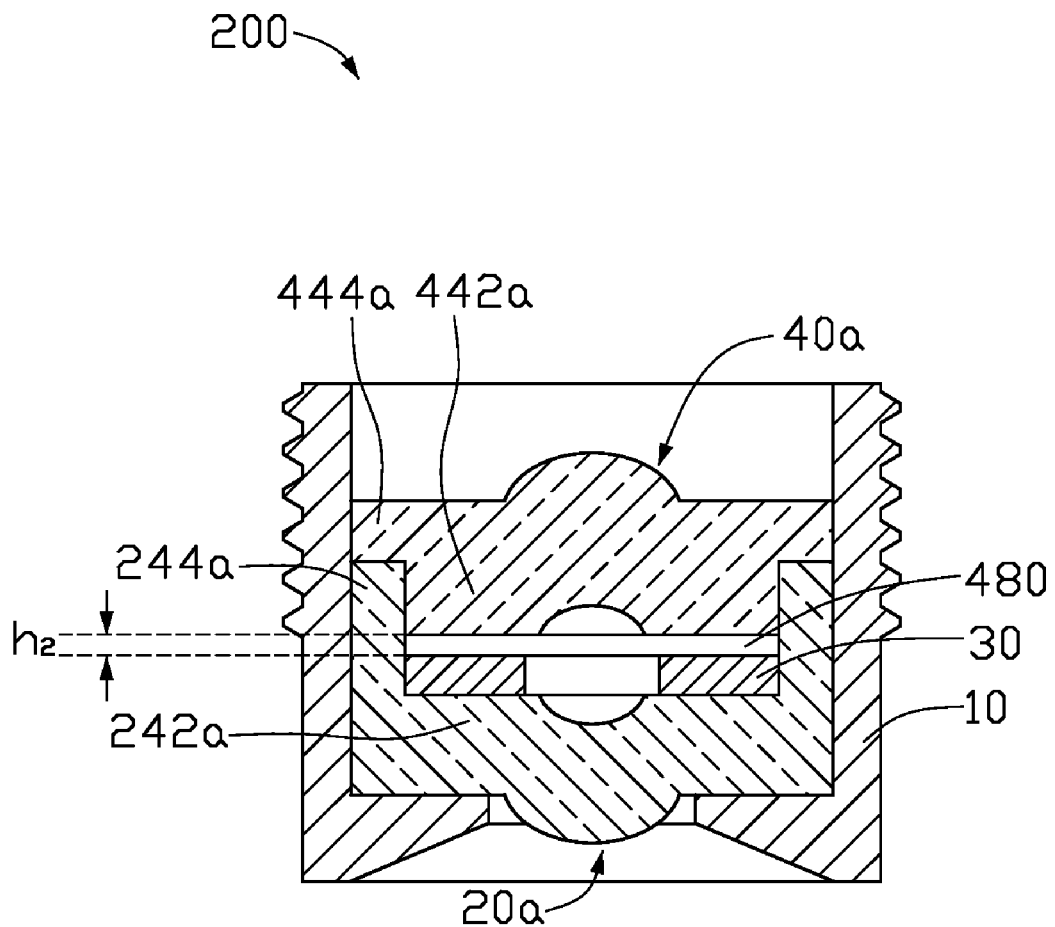
FIG. 3 is schematic view of a lens module according to a second embodiment of the present invention.

Referring to FIG. 3, an exemplary lens module 200 according to a second preferred embodiment is provided. The lens module 200 is essentially the same as the lens module 100. However, the flange 444a of the second lens 40a is in contact with the cylindrical portion 244a of the first lens 20a, and a gap 480 is maintained between the second base portion 442a of the second lens 40a and the spacer 30. The gap 480 provides a space for the second base portion 442a of the second lens 40a and the first base portion 242a of the first lens 20a together with the spacer 30. A distance $h_2$ at the gap 480, as shown in FIG. 3, may be in the range from 2 to 30 micrometers, preferably, in the range from 5 to 10 micrometers.

Figure 4:
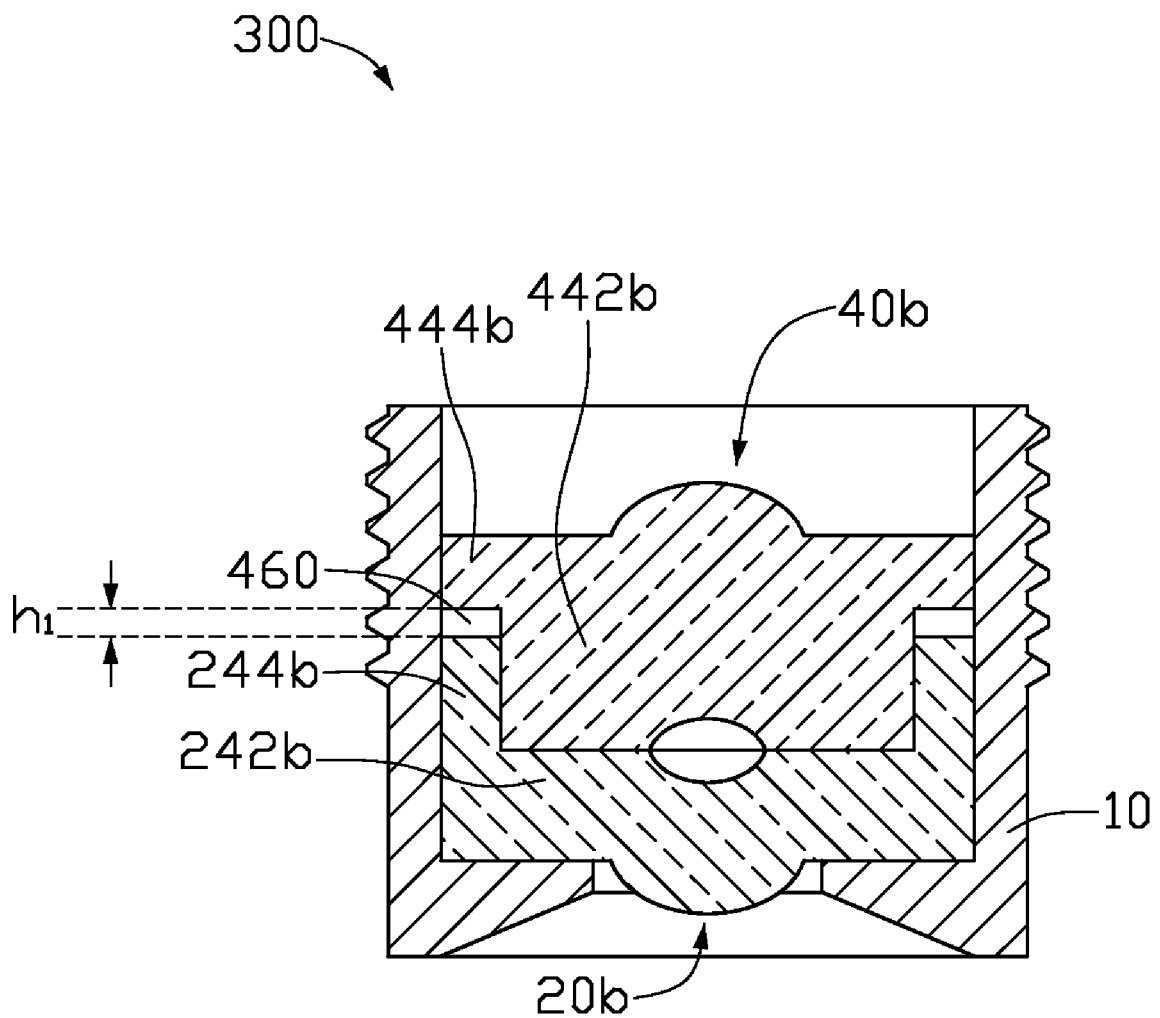
FIG. 4 is schematic view of a lens module according to a third embodiment of the present invention.

Referring to FIG. 4, an exemplary lens module 300 according to a third preferred embodiment is provided. The lens module 300 is essentially the same as the lens module 100. The gap 460 is maintained between the flange 444b of the second lens 40b and the cylindrical portion 244b of the first lens 20b. However, the spacer 30 is omitted, and the second base portion 442b of the second lens 40b is in contact with the first base portion 242b of the first lens 20b.

Figure 5:
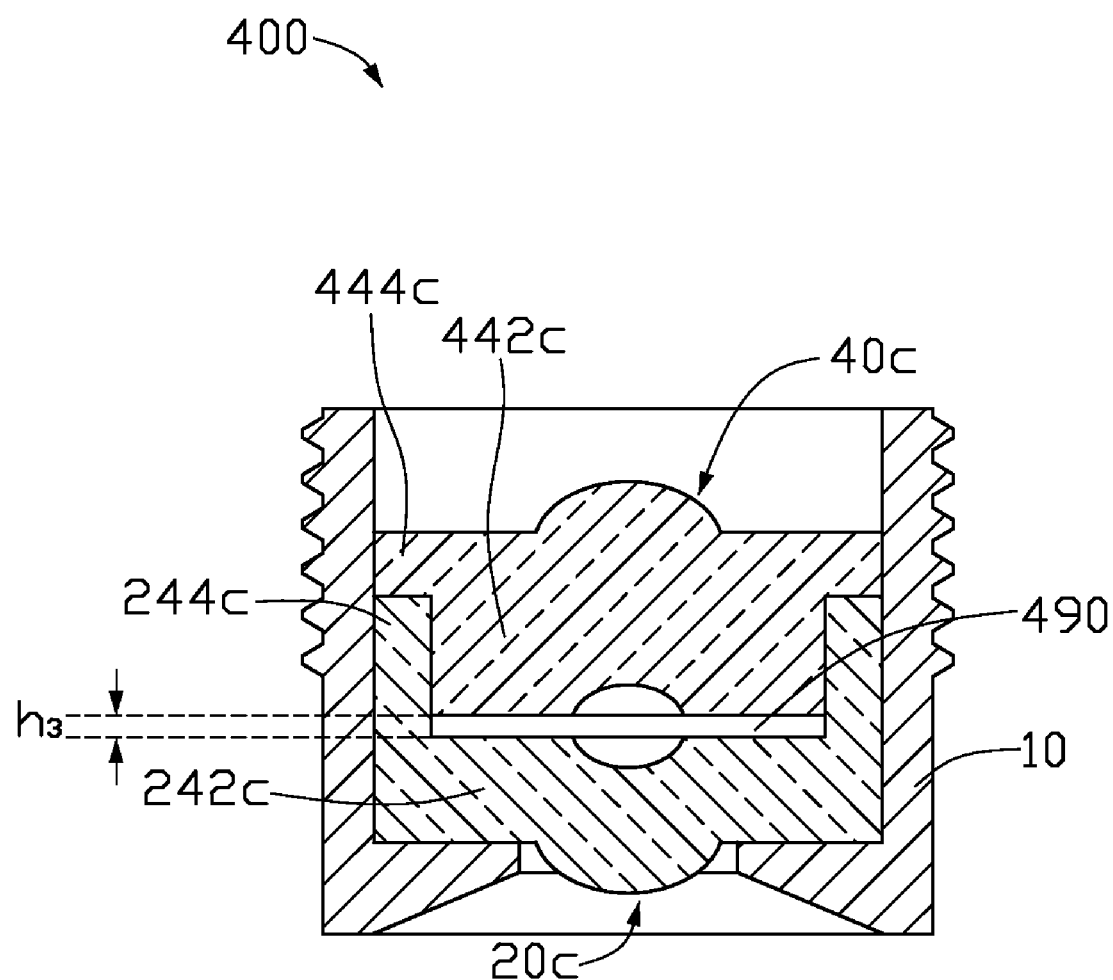
FIG. 5 is schematic view of a lens module according to a fourth embodiment of the present invention.

Referring to FIG. 5, an exemplary lens module 400 according to a fourth preferred embodiment is provided. The lens module 400 is essentially the same as the lens module 200. The flange 444c of the second lens 40c is in contact with the cylindrical portion 244c of the first lens 20c. However, the spacer 30 is omitted, and a gap 490 is maintained between the second base portion 442c of the second lens 40c and the first base portion 242c of the first lens 20c. A distance $h_3$ at the gap 490, as shown in FIG. 5, may be the same as the height $h_2$ of the gap 480 shown in FIG. 3.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
    a lens barrel;
    a first lens received in the lens barrel, the first lens having a first central active portion and a first peripheral inactive portion, the first peripheral inactive portion including a first base portion surrounding the first central active portion and a cylindrical portion extending upward from the first base portion; and
    a second lens having a second central active portion and a second peripheral inactive portion, the second peripheral inactive portion including a second base portion surrounding the second central active portion and a flange extending radially outward from the second base portion, the second base portion of the second lens being engaged in the cylindrical portion of the first lens, the flange being maintained above the cylindrical portion of the first lens, a gap being maintained between the second base portion of the second lens and the first base portion of the first lens, and the flange of the second lens being in contact with the cylindrical portion of the first lens, wherein a spacer is sandwiched between the second base portion of the second lens and the first base portion of the first lens, and the thickness of the spacer is less than a height of the gap along a direction parallel with the axis of the optical axis of the second central active portion.

2. The lens module as described in claim 1, wherein an inner diameter of the cylindrical portion is in a range from 2 to 10 millimeters.

3. The lens module as described in claim 1, wherein a distance between the second base portion of the second lens and the first base portion of the first lens at the gap is in a range from 2 to 30 micrometers.

4. The lens module as described in claim 1, wherein a distance between the second base portion of the second lens and the first base portion of the first lens at the gap is in a range from 5 to 10 micrometers.

* * * * *